United States Patent [19]

Schitemaker

[11] Patent Number: 4,732,332

[45] Date of Patent: Mar. 22, 1988

[54] PICK-UP AND DELIVERY VEHICLE

[75] Inventor: Johannes Schitemaker, Rijssen, Netherlands

[73] Assignee: Schuitemaker Machines, B.V., Netherlands

[21] Appl. No.: 887,106

[22] PCT Filed: Oct. 31, 1985

[86] PCT No.: PCT/NL85/00043
§ 371 Date: Jul. 1, 1986
§ 102(e) Date: Jul. 1, 1986

[87] PCT Pub. No.: WO86/02802
PCT Pub. Date: May 22, 1986

[30] Foreign Application Priority Data

Nov. 6, 1984 [NL] Netherlands .......................... 8403377

[51] Int. Cl.⁴ .............................................. B02C 18/18
[52] U.S. Cl. ..................... 241/32; 241/101.7; 241/241
[58] Field of Search ...................... 56/14.3, 14.5, 14.6; 241/101.7, 222, 101 A, 32, 287, 190, 288, 239, 240, 241; 83/662, 856, 858

[56] References Cited

U.S. PATENT DOCUMENTS

| 2,892,478 | 6/1959 | Gronberg | 241/190 |
| 3,027,925 | 4/1962 | Gronberg | 241/287 X |
| 4,612,941 | 9/1986 | Kunde | 241/241 X |

FOREIGN PATENT DOCUMENTS

| 1916046 | 10/1970 | Fed. Rep. of Germany | 241/32 |
| 2818850 | 11/1979 | Fed. Rep. of Germany . | |
| 420705 | 3/1967 | Switzerland . | |
| 2032376 | 5/1980 | United Kingdom . | |
| 2055557 | 3/1981 | United Kingdom . | |

OTHER PUBLICATIONS

European Patent Application, 74172, 3-1983.

Primary Examiner—Mark Rosenbaum
Attorney, Agent, or Firm—Brooks Haidt Haffner & Delahunty

[57] ABSTRACT

A cross-beam at the front end of a vehicle body carries knives which are rotatable between a position in which they extend into a conveyor duct and an upper position for inspection and/or sharpening. A pronged pusher moves fodder material gathered by a pick-up from the knives to the duct, when the material passes to a cross-conveyor for deposition of the fodder material. The vehicle advantageously has a short wheelbase.

11 Claims, 7 Drawing Figures

PICK-UP AND DELIVERY VEHICLE

The present invention relates to a pick-up and delivery vehicle comprising a body at the front of which there is provided a pick-up mechanism including a pick-up linking up with a conveyor duct terminating in the body, into which duct extend from one end prongs of a pusher wheel and from the other end cutting knives mounted on a rotary cutter beam or the like. Such a pick-up and delivery vehicle is described e.g. in European patent application No. 0 074 172.

Such generally known pick-up and delivery vehicles are complicated, prone to trouble and breakdown, require high maintenance cost, suffer heavy wear and, hence require high writings-off and, moreover, are difficult to operate. Since such vehicles are designed for picking up grass, beet leaf and the like and, after transport, depositing the same in a feeding trough or on a silage pile, it is important that the product to be loaded is cut into short pieces. The resultl is that the material picked up at the front and discharged at the back can be easily processed and, moreover, that proper removal of the oxygen during the compaction of the silage pile is ensured, resulting in a better quality. Cutting the product into short pieces means that a large number of knives have to be mounted side by side in the conveyor duct. Said knives have to be replaced or sharpened several times a day; a blunt knife requires a large tractor capacity.

In the prior art vehicles sharpening or replacing the knives has to be carried out in a strongly stooped or creeping posture, mostly under the vehicle. The result is that the knives are often not sharpened in time, thus materially increasing the fuel consumption of the tractor.

It can be observed in respect of the protection of the knives against foreign articles that, in the prior art constructions, this is effected mechanically by means of one or more springs and lever systems, which can be blocked easily by dirt and rust.

Besides, the drawhook or pole of the prior art pick-up and delivery vehicles is mostly designed as a fold pole, since otherwise the prongs of the pick-up will engage the product as the vehicle is rolled on or off the silage pile, so that this product will be carried along the the pick-up and delivery vehicle becomes stuck after a few moments. A fold pole, however, renders said vehicle more complicated and more expensive.

It is observed that two types are distinguished in the prior art pick-up and delivery vehicles, i.e. one fitted with a pick-up in a front or leading position and one fitted with a trailing pick-up. The trailing pick-up has the advantage of being more suitable for high loading speeds and being less expensive, but has the drawback that, as all vehicles hitherto known have a long front structure (i.e. rather a long portion ahead of the body front) the tractor driver has a poor view of the picking-up operation.

Moreover, owing to their long front structure these vehicles have a larger wheelbase (i.e. the perpendicular distance between the rear axle of the tractor and the axle of the pick-up and delivery vehicle). A result of this large wheelbase is that the space underneath the pick-up is adversely affected when the vehicle is driven up the slopes of a silage pile. Another drawback of this large wheelbase is that the train is difficult to manoeuvre on a small surface area.

It is an object of the present invention to remove these drawbacks.

To this end, according to the invention, a vehicle of the above described type is characterized in that adjacent the front of the body, there is provided a cross-beam designed at least in part with cylindrical portions mounting rotary knife attachment elements. Said elements can be rotated in such a manner that the knives can be easily removed from the front in forward and/or upward direction. It is thus possible for the tractor driver to replace or sharpen the knives at normal standing/working height.

About the cylindrical portions of the cross-beam, there may be provided two or more rings connected by a cross-bar and the knives may be mounted on said cross-bar, there being further provided means for automatically locking and unlocking the knives upon rotation of said cross-bar: separate means for unlocking or locking the knives are therefore superfluous.

The knives, which have a plurality of cutting edges, may be provided at each side distal from said cutting edges with a recess corresponding with their location on the cross-bar and adjacent at least one side edge with a locking recess adapted to coact with a locking rod having a flat side or the like, said rod being mounted for rotation in supports connected to the cross-bar and on the other hand is controlled by at least one lever guided by a corresponding cam disc or plate fixedly connected to the crossbeam.

In a construction in which the cross-bar can be remote-controlled by hydraulic means, and in which means are provided for temporarily moving one or more knives entirely or partly out of the conveyor duct in case of their being overloaded, the hydraulic circuit may incorporate an adjustable overload valve, an accumulator and/or the like. As a result, a substantially more reliable construction is obtained than the prior art protection device having springs and levers.

Said hydraulic circuit may be fitted with a pressure gauge by means of which said overload valve can be adjusted, in known manner, but also the bluntness of the knives can be determined. The pressure gauge may e.g. comprise an additional disc fitted with a green and a contiguous red zone, so that the operator can see from the tractor whether the knives are to be replaced or sharpened.

The prior art pick-up and delivery vehicles are usually fitted at the front with a gearbox operable by the power take-off shaft of the tractor, said gearbox linking up with half-shafts to either side of the pick-up and delivery vehicle for transmitting a rotary movement to the pick-up mechanism, and to delivery means disposed at the rear end of the vehicle. According to the present invention said gearbox is accommodated in the crossbeam, in contrast to the prior art apparatus, wherein the gearbox is arranged in front of the body beams. As a result a substantial saving in space is produced, so that the wheelbase, as referred to above, can be reduced.

By fitting the front of the conveyor duct with an extension in downward direction in the form of a curved slide plate, it is further achieved that when the pick-up and delivery vehicle is driven over a silage pile, the material already deposited is pressed downwards. This reduces the chance of contact of the pick-up with the silage pile when the vehicle is driven up or off said pile.

In a prior art pick-up and delivery vehicle the connection between one of the half-shafts and one of the delivery rollers consists of a transmission from the respective half-shaft via a right-angled gearing, a shaft extending longitudinally of the vehicle, a right-angled gearing, and a chain to the lower delivery roller. In the present invention, however, the connection between the half-shaft at the front of the pick-up and delivery vehicle and the delivery means at the rear of the vehicle consists of a single direct chain connection supported along the vehicle's body by synthetic plastics guides. Such a construction is inexpensive and, moreover, not prone to mechanical trouble.

In a further embodiment of the present invention, the drawhook of the pick-up and delivery vehicle can be mounted for rotating adjustment on the round cross-beam.

Accordingly, the round cross-beam has several functions: it serves as a pivot point for the knives, it accommodates the gearbox and the drawhook is attached to it. As a result, a short construction or short wheelbase of the vehicle has become possible.

For the purpose of delivering material, the prior art pick-up and delivery vehicles comprise delivery means including one or more delivery rollers disposed adjacent the rear edge of the body, as well as a cross-conveyor located downstream of, and movable relatively to, said delivery means, and furthermore the rear flap is rotatable about an overhead axis.

When, in the known apparatus, there is a changeover from feeding to ensiling, which often has to be done twice a day in the season, first the rear wall has to be loosened relative to the cross-conveyor, then the cross-conveyor has to be pushed or turned out of the way, after which the rear wall has to be opened to enable unloading over the pit. By affixing the cross-conveyor to the rear flap, according to the present invention, there is obtained a substantially simpler apparatus.

The very short "front structure" of the pick-up and delivery vehicle, together with the use of a trailing pick-up results in the tractor driver having an optimum view of the picking up operation.

Besides, the pick-up and delivery vehicle according to the present invention may include a pusher wheel fitted with group-wise staggered prongs attached thereto, each group including at least four prongs. It is thus achieved that each time one after the other, a group of prongs comes into engagement with the material to be transported. This produces a certain shaking effect, thus minimizing the chance of clogging, as well as damage to the material to be transported. An additional advantage is that when picking up a piece of wood or the like, the sudden forces which occur will be distributed over, and taken up by several prongs. Such an arrangement of the prongs is an improvement over the prior art disclosed in German Pat. No. 2,927,334, where the prongs are arranged in a helical pattern, so that they are subjected to highly uniform loads so long as the product is handled, but large peak loads are exerted on the individual prongs when a piece of wood or the like is picked up.

There is, however, no shaking effect in this prior apparatus.

One embodiment of the pick-up and delivery vehicle according to the present invention will now be described, by way of example, with reference to the accompanying drawings, in which.

As shown in the drawings, a pick-up and delivery vehicle comprises a body 1 under which there are arranged one or two wheeled axles 2. Adjacent the front there is provided a drawhook 3 through which the vehicle can be coupled to a tractor 4.

The bottom of body 1 is fitted with beams 5 and includes a floor chain 6 having catches. At the front, the vehicle includes a pick-up mechanism 7 and, at the back, two superimposed delivery rollers 8. Furthermore, downstream of the delivery rollers, there is arranged a cross-conveyor 9 used for depositing fodder material laterally, e.g. in a trough. Contrary to that in the prior art apparatuses, cross-conveyor 9 is affixed to a rear flap 10 movable by means of piston-and-cylinder assemblies 11 disposed on opposite sides of the body.

The above pick-up mechanism 7 includes two side plates 12 attached to the body, which plates rotatably mount a tubular shaft 13 carrying a pusher wheel 14 fitted with tines or prongs. Also rotatable about the axis of said shaft 13 is a pick-up 15, which will not be further described herein, since it is well known.

Figure 7:
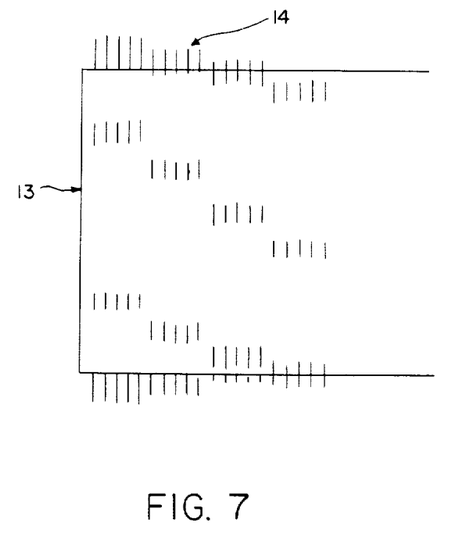
FIG. 7 is a diagrammatic side view of the pusher wheel used in the apparatus of FIGS. 1-6.

As shown in the side view of pusher wheel 14 of FIG. 7, the prongs, not further indicated, are staggered groupwise thereon. In the embodiment shown, each group consists of five prongs. The construction is such that upon rotation of the pusher wheel, each group of prongs contact the material to be picked up distinctly one after the other, so that a certain shaking effect is produced, with the resultl that there is a minimum chance of damage to the material or of clogging. Also, a stick or the like picked up can thus be handled in a better way.

The prongs of pusher wheel 14 extend into a duct 16 defined by an extension 17 of the front wall of the body and on the other end by the pusher wheel and strippers 18 extending between the prongs.

Provided further between the side plates 12, is a tubular cross-beam 19 which is multi-functional:

In the first place, some rings 20 are disposed thereon which are interconnected by a cross-bar 21. Cross-bar 21 is fitted with a plurality of supports 22. Mounted on the cross-bar and between the supports are knives 23 having a recess corresponding with cross-bar 21. Besides, the knives are provided on opposite sides with a recess 24 adapted to coact with a rod 25 extending rotatably through the supports 22 and having a flat side or the like, said rod being provided at its ends with a lever 26 that is fixedly secured to it. The free end of lever 26 carries a roll 27 adapted to coact with a guide or cam plate 28 fixedly connected to the side plates 12. As shown in the drawings, rings 20 are controlled by a piston-and cylinder assembly 29 secured to the side plates 12. By operating said assembly, the knives 23 can be brought from the position shown in solid lines in FIG. 2 into the extreme left position shown by chain-dotted lines. The intermediate positions of knives 23 shown by chain-dotted lines in FIG. 2 will be further discussed hereinafter.

Naturally, the cutter beam may alternatively be mounted so that its axis of rotation is not co-axial with the cross-beam, i.e. so that its axis of rotation is not the cross-beam axis but an axis of rotation (stub shafts) spaced apart therefrom.

Figure 1:
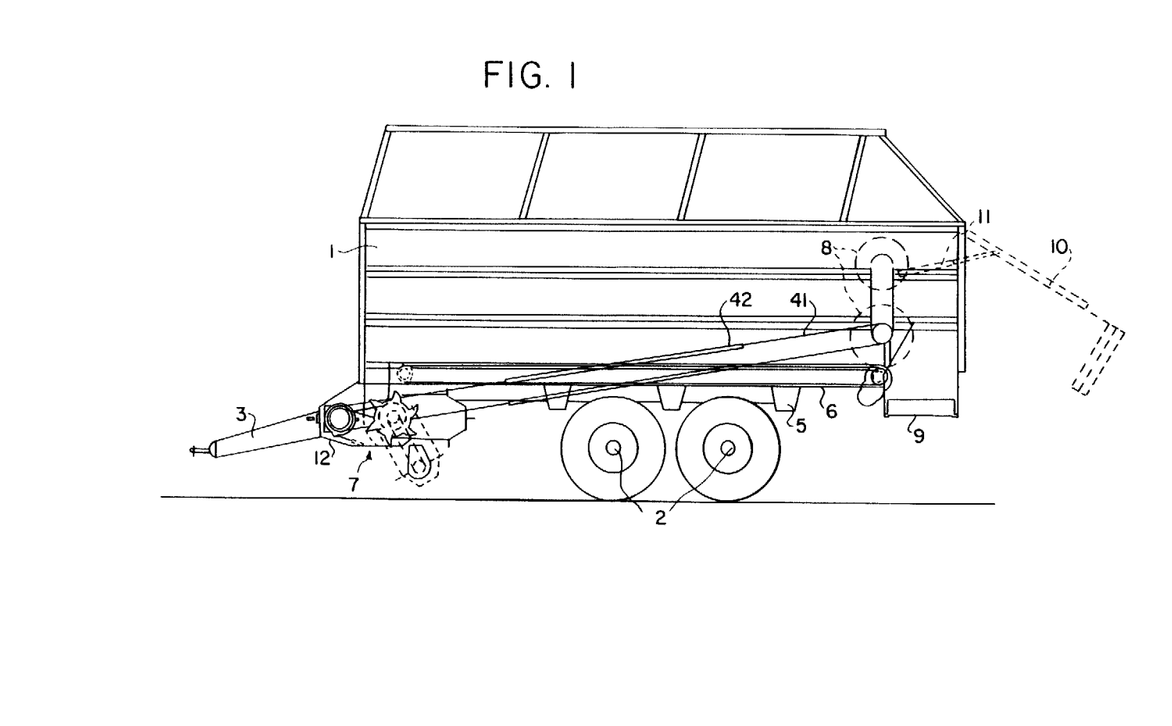
FIG. 1 is a diagrammatic side view of a pick-up and delivery vehicle.
Figure 2:
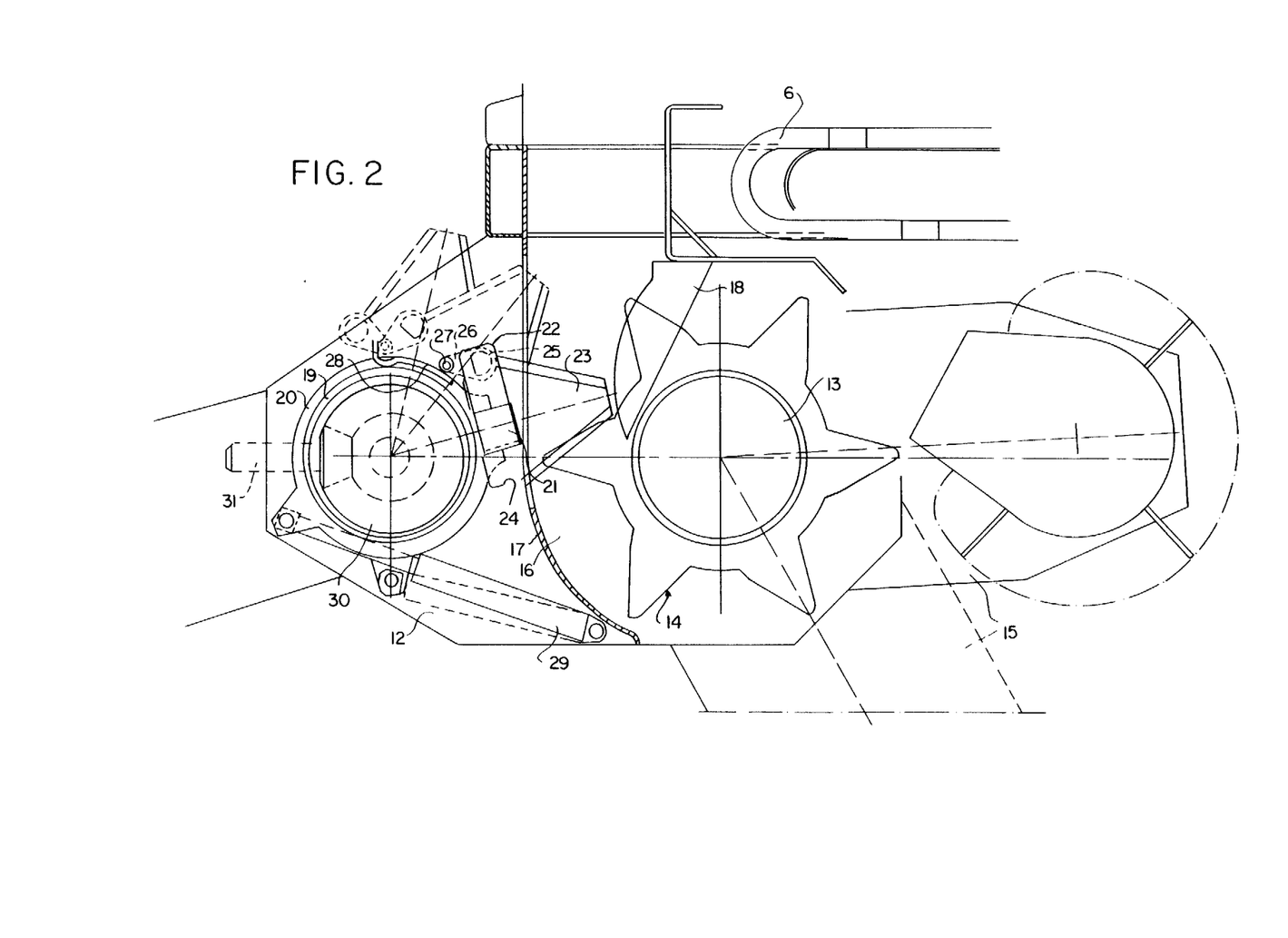
FIG. 2 shows an enlarged detail of the apparatus shown in FIG. 1; illustrating the attachment of the knives.

As further shown in the drawings, the pick-up 15 can be moved by means, not shown, from the lowered position, in which material is picked up, into an upwardly moved position underneath the body, in which position no material can be picked up anymore (see FIGS. 1 and 2).

The second function of the tubular cross-beam 19 is that it houses a known per se gearbox 30. The input shaft 31 projecting from the front is destined for connection to the power take-off shaft, not shown, of tractor 4. Gearbox 30 also includes two half-shafts, selectively operable, and projecting from opposite sides of the cylindrical cross-beam 19. The half-shaft projecting from the one side serves for transmitting the rotary movement onto the pick-up mechanism 7, while the half-shaft projecting from the other side serves for transmitting a rotary movement to the delivery rollers 8.

Figure 3:
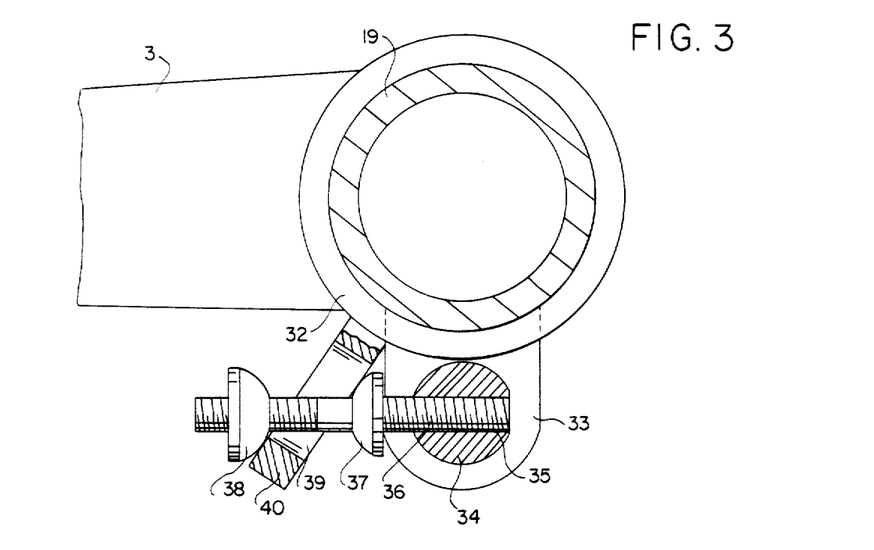
FIG. 3 shows the attachment of the drawhook or pole of the apparatus of FIGS. 1 and 2.

The third function of the cylindrical cross-beam 19 is that it adjustably mounts the drawhook 3. To that end, (see FIG. 3) there is provided a collar 32 to which drawhook 3 is attached. Collar 32 is mounted between lips 33 rotatably journalling a shaft 34. Shaft 34 is fitted with a threaded bore 35 into which extends a threaded spindle 36 mounting an attaching disc 37, as well as an attaching disc 38. Spindle 36 extends through a slotted opening 39 of a lug 40 affixed to collar 32. By these means, the drawhook 3 can be adjusted relatively to cross-beam 19.

The connection between gearbox 30 and the lower delivery roller 8 is realized by means of the above half-shaft, not further indicated, and a chain 41 (see FIG. 1), which is supported at the side of the body by known per se synthetic plastics guides 42. The connection between the two delivery rollers 8 is implemented in known manner by a chain.

As described hereinbefore, the knives 23 can be moved by the piston-and-cylinder assembly 29 into two positions, i.e. one in which the knives extend into the conveyor duct 16 and one in which the knives are oriented upwards, in which latter position they can be conveniently removed by rotation of the flat-sided rod 25 (see FIG. 2). In the intermediate position of the knives 23 shown by chain-dotted lines, they can let pass any stones, wood or the like that may be picked up. This intermediate position can be realized by means of a hydraulic circuit shown diagrammatically in FIG. 4.

Figure 4:
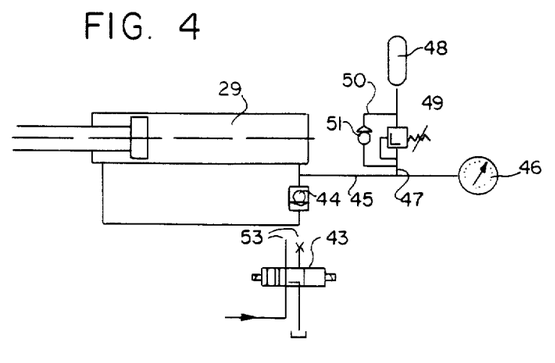
FIG. 4 diagrammatically shows the knife protection system used in the apparatus of FIG. 1.

The hydraulic cylinder 29 is operable from the tractor through a line 53 having a four-way valve 43. The supply and return line 53 also incorporates a non-return valve 44. As shown in FIG. 4, the line section between non-return valve 44 and the one side of the piston connects to a line 45 to the other end of which there is connected a pressure gauge 46. Line 45 communicates through a branch line 47 with an adjustable overload valve 49, behind which there is disposed, in the example shown, a nitrogen accumulator 48. In the branch line 47, there is provided around the adjustable overload valve 49 a bypass 50 having a non-return valve 51.

Figure 5:
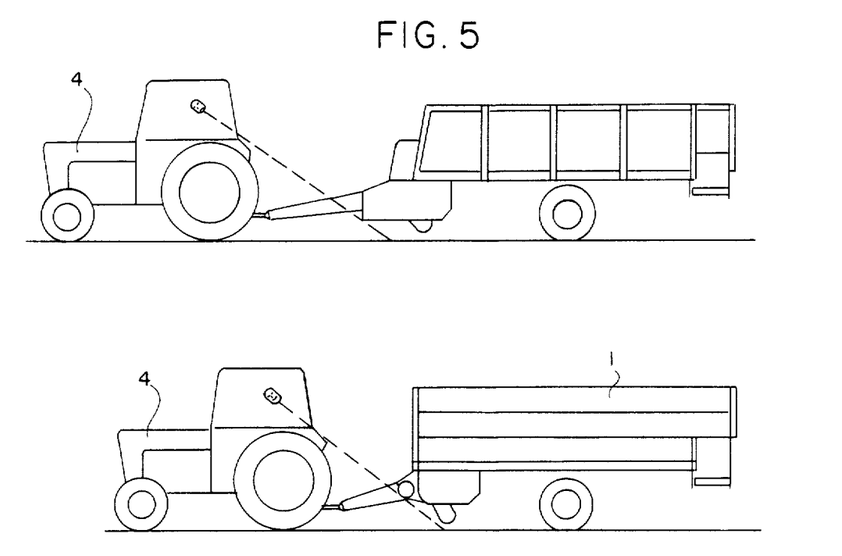
FIG. 5 shows a comparison between the view of the picking up operation in a prior art pick-up vehicle and that according to the present invention.
Figure 6:
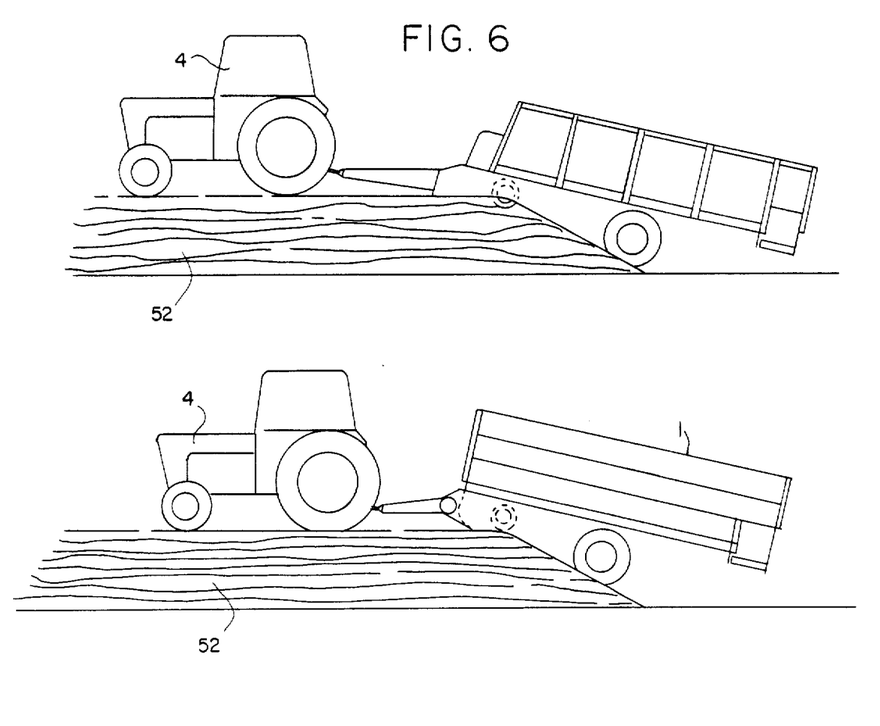
FIG. 6 shows a comparison between a tractor with a prior art pick-up and delivery vehicle, and with the vehicle according to the present invention as they are driving up a silage stack.

The construction described above has several advantages, some of which are shown in FIGS. 5 and 6.

FIG. 5 shows in the upper part a tractor having a conventional pick-up and delivery vehicle behind it. As shown in the figure, the tractor driver has a particularly poor view of the pick-up mechanism. In contrast thereto, the tractor driver in the construction according to the present invention, shown in the lower half of FIG. 5, has a good view of the pick-up mechanism, which is achieved by a short construction of the pick-up mechanism with a modified attachment thereof to the body.

A further result of this short construction is that a small distance between axle 2 of the vehicle and the rear axle of tractor 4 is obtained. The shorter said "wheelbase", the better the combination can be manoeuvred on small areas, while it also alleviates the problems encountered during the driving up and off a silage pile stack.

FIG. 6 (upper part) shows a tractor with a conventional pick-up and delivery vehicle and the lower figure shows a tractor with a pick-up and delivery vehicle according to the present invention. In order to minimize the problems occurring during the driving up the silage stack, not only can the pick-up be lifted as much as possible, i.e. to above the level of the pusher wheel 14 (see FIG. 2), but the portion 17 bounding the conveyor duct is extended downwardly relative to the prior art apparatus to adjacent the underside of the pusher wheel, so that during the driving on or off the silage stack 52 the material already deposited is pressed downwards.

The vehicle according to the present invention further comprises hydraulic drive mechanisms fed by the hydraulic circuit of the tractor, which mechanisms are known per se and hence not further indicated herein.

In addition to the advantages of a shorter construction, the pick-up and delivery vehicle according to the present invention has the advantages of a simple drive mechanism for the delivery rollers, a simple construction for the displacement of the cros-conveyor, a simple and reliable protection of the knives against overload, etc.

It will be clear that many modifications are possible within the scope of the present invention.

Thus, for instance, instead of the hydraulic piston-and-cylinder assembly 29, use can be made of a linear electromechanical drive mechanism, which is marketed e.g. by the American firm Warner Electric. This makes it possible to be independent of the presence or absence of hydraulics on the tractor: a current source (battery) is necessary only.

The protection mechanism, too, i.e., the return feature, can be designed in an entirely different manner: use can be made of two levers which can pivot relatively to each other, and the pivotal joint of which is operated by a gas cylinder which in turn is adjustable by means of, on the one hand an adjusting screw and, on the other hand, the pressure in the gas cylinder.

I claim:

1. In a pick-up and delivery vehicle of the type used for fodder material, and having a body at the front of which is disposed a pick-up mechanism linking up with a conveyor duct terminating in said body, into which duct there extend cooperating prongs of a pusher wheel and cutting knives, a cross-beam carrying two or more rotatable rings interconnected by a cross-bar upon which cross-bar said cutting knives are mounted for movement away from said prongs and between different positions in relation to said conveyor duct so that said knives are accessible from above said cross-bar for maintenance or replacement.

2. The apparatus of claim 1 and including means for automatically locking or unlocking the knives in position upon rotation of the cross-bar.

3. The apparatus of claim 2 wherein said means for automatically locking said knives includes a locking rod mounted for rotation in supports connected to said cross-bar, said locking rod being controlled by means of a lever.

4. Apparatus according to claim 1 in which the cross-bar is remote-controlled by hydraulic means and means are provided for temporarily moving one or more knives entirely or partly out of the conveyor duct, said hydraulic means including an adjustable overload valve reponsive to loading on said knives.

5. The apparatus of claim 4 wherein said hydraulic means comprises a pressure gauge for adjusting said overload valve and determining bluntness of the knives.

6. The apparatus of claim 1 and including a gearbox operable by a power take-off shaft of a tractor, said gearbox linking up with half-shafts to either side of the vehicle for transmitting a rotary movement to the pick-up mechanism and to delivery means at the rear of the vehicle, said gearbox being accomodated in said cross-beam.

7. The apparatus of claim 6 wherein said half-shaft and delivery means comprises a chain supported by synthetic plastics guides.

8. The apparatus of claim 1 and including a drawhook mounted for rotating adjustment on said cross-beam.

9. Apparatus according to claim 1 and including delivery means comprising one or more delivery rollers disposed adjacent a rear edge of said body, and a cross-conveyor located downstream of, and movable relative to said delivery means, and a rear flap carrying said cross-conveyor, said rear flap being rotatable about a horizontal axis.

10. The apparatus of claim 1 wherein the conveyor duct extends downwardly and includes a curved side plate.

11. The apparatus of claim 1 wherein the prongs of said pusher wheel are staggered group-wise, each group consisting of at least four prongs.

* * * * *

UNITED STATES PATENT AND TRADEMARK OFFICE
CERTIFICATE OF CORRECTION

PATENT NO. : 4,732,332
DATED : March 22, 1988
INVENTOR(S) : Johannes Schuitemaker It is certified that error appears in the above-identified patent and that said Letters Patent is hereby corrected as shown below:

Title page under heading INVENTOR:

Name of inventor is misspelled as "Johannes Schitemaker", inventor's name should read --Johannes Schuitemaker--.

In the ABSTRACT: line 6, "duct, when the material" should read: --duct, whence the material--.

Col. 1, line 21: "The result1 is" should read: --The result is--.

Col. 1, line 46: "along the the" should read: --along and the--.

Col. 4, line 45: "with the result1" should read: --with the result--.

Signed and Sealed this

Fifth Day of July, 1988

*Attest:*

DONALD J. QUIGG

*Attesting Officer*      *Commissioner of Patents and Trademarks*